D. O. ROYSTER.
METHOD OF AND APPARATUS FOR SYNCHRONOUSLY MAKING MOTION PICTURES
AND SOUND RECORDS.
APPLICATION FILED MAR. 16, 1914.

1,164,401.

Patented Dec. 14, 1915.

Attest:

Inventor:
David O. Royster

UNITED STATES PATENT OFFICE.

DAVID O. ROYSTER, OF ST. LOUIS, MISSOURI.

METHOD OF AND APPARATUS FOR SYNCHRONOUSLY MAKING MOTION-PICTURES AND SOUND-RECORDS.

1,164,401.

Specification of Letters Patent.

Patented Dec. 14, 1915.

Application filed March 16, 1914. Serial No. 824,895.

*To all whom it may concern:*

Be it known that I, DAVID O. ROYSTER, a citizen of the United States, residing at St. Louis, Missouri, have invented a certain new and useful Improvement in Methods of and Apparatus for Synchronously Making Motion-Pictures and Sound-Records, of which the following is a full, clear, and exact description, such as will enable others skilled in the art to which it appertains to make and use the same, reference being had to the accompanying drawings, in which—

Figure 1:
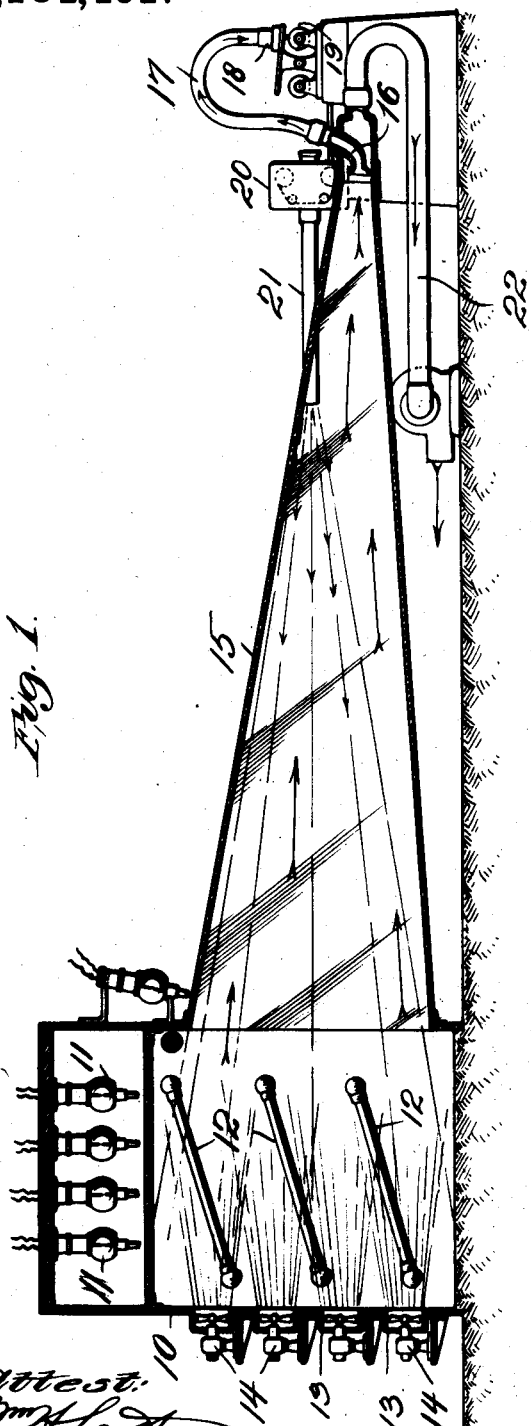
Figure 2:
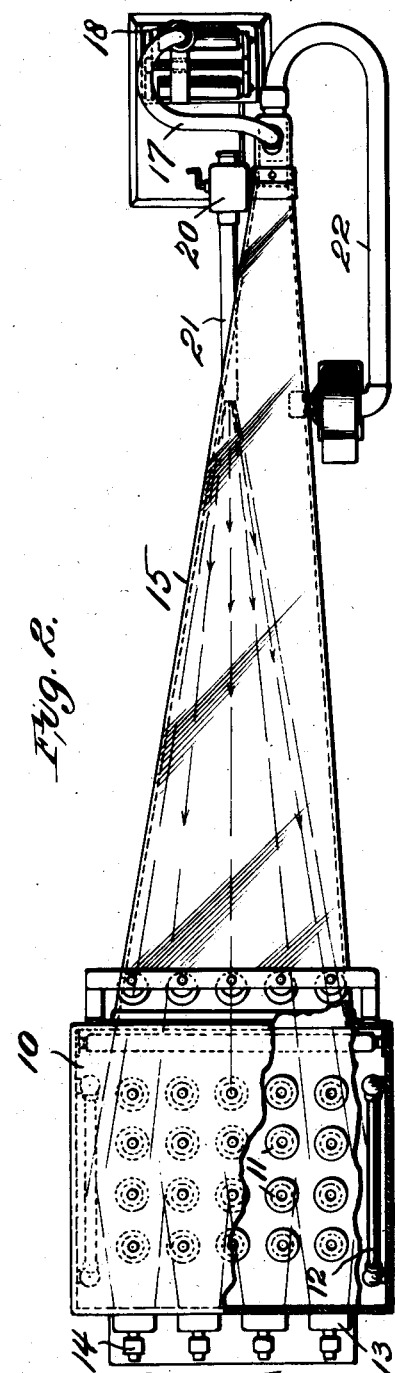

Figure 1 is a vertical section taken lengthwise through the center of an apparatus of my improved construction. Fig. 2 is a plan view of the apparatus with a part thereof in horizontal section.

My invention relates to a new and improved method of and apparatus for synchronously making motion pictures and sound records, the principal object of my invention being to provide a comparatively simple and inexpensive apparatus which can be readily utilized for taking motion pictures and making sound records which when reproduced will be absolutely synchronous.

In taking motion pictures the object to be photographed is necessarily located a certain distance away from the camera and the methods heretofore practised for making records of the sounds produced by photographed objects have not always resulted in perfect synchronisms between the reproduced pictures and sounds, and in my improved method and apparatus, I propose to provide means wherein all the sounds made by an object which is being photographed will be drawn through a tapered chamber to a point of concentration, from whence they are delivered directly to the sound recording device, which latter is located adjacent to and operated synchronously with the motion picture camera.

With the above and other objects in view, my invention consists in certain novel features of construction and arrangement of parts, hereinafter more fully described and claimed.

Referring by numerals to the accompanying drawings, 10 designates a housing which is adapted to be occupied by the object to be photographed and the interior of this housing is lighted in any suitable manner, preferably by means of a series of arc lamps 11, located in the upper portion of the housing and also by means of mercury vapor lamps 12 located adjacent to the side walls of the housing.

Formed in the rear wall of the housing is a series of openings which are partially inclosed by small housings 13 and located in these small housings are small electric fans 14.

Connected to the front wall of the housing and projecting outwardly therefrom is one end of an elongated hollow cylinder 15 which tapers gradually toward its outer end, said cylinder being constructed of any desired material, but preferably of glass. Located in the small outer end of this tapered cylinder is a receiver 16 and leading therefrom is a tube 17 which connects with the recorder 18 of a sound recording device 19. Located immediately adjacent to this sound recording device and adapted to be operated synchronously therewith is a motion picture camera 20, the same having a tubular extension 21 which extends into the tapered cylinder 15 so that the lenses of said camera are focused upon the center of the housing 10. Leading from the small outer end of the cylinder 15 to a suitable suction producing device such as a fan is a tube 22.

In the operation of my improved apparatus, the camera 20 and sound recording device 19 are simultaneously operated and the object to be photographed occupies the housing 10. The fans 14 and suction producing device connected to tube 22 are simultaneously operated, thereby creating a flow of air through the housing 10, and through the tapered cylinder 15, which air finally passes through pipe 22 and discharges from the suction device connected thereto. The motions of the object within the housing 10 are photographically reproduced upon the film in the camera 20 and the sound waves produced by said object are carried through the cylinder 15, with the draft of air throughout, which sound waves are concentrated at the small outer end of the cylinder 15 where they are caught by the receiver 16 and transmitted to the reproducer 18 through tube 17. The recorder 18 acts directly upon the wax cylinder or disk of the sound recording device, and thus the sounds made by the object within the housing 10 are synchronously recorded with the pictures made by the camera 20.

By producing a current of air through the housing 10 and cylinder 15 practically all the sounds made by the object within said housing are carried directly to the transmitter 16 and as the cylinder 15 is tapered toward its outer end these sounds are condensed so as to make a very clear and perfect record upon the cylinder or disk of the recording device 19.

An apparatus of my improved construction is comparatively simple, can be easily operated and provides means whereby motion pictures and sound records of absolute synchronism can be readily and cheaply produced.

If desired the housing 10 can be constructed of glass or other transparent material in order that pictures can be taken by natural light.

It will be readily understood that minor changes in the size, form and construction of the various parts of my improved apparatus can be made and substituted for those herein shown and described, without departing from the spirit of my invention, the scope of which is set forth in the appended claims.

I claim:

1. The hereindescribed method of synchronously making motion pictures and sound records, consisting in synchronously operating a motion picture camera and a sound recording device, focusing the camera on an object within a housing and transmitting the sounds made by the object within the housing by means of a current of air which is gradually condensed during its travel from the housing to the reproducer of the sound recording device.

2. The hereindescribed method of synchronously making motion pictures and sound records which consists in synchronously operating a motion picture camera and a sound recording device, focusing the camera on the object within a housing, forcing air into and through the housing, confining the air delivered to the housing, and conveying it to a point adjacent to the sound recording device and transmitting the sound waves carried by said air to the sound recording device.

3. In an apparatus of the class described, a housing, a cylinder connected thereto, which cylinder tapers toward its outer end, a motion picture camera and a sound recording device located adjacent to the outer end of the cylinder, a tubular connection from the outer end of the cylinder to the sound recording device, and means for creating a current of air through the housing and cylinder.

4. In an apparatus of the class described, an elongated cylinder which tapers from one end to the other, a motion picture camera and a sound recording device located adjacent to the small end of the cylinder, a connection from the cylinder to the reproducer of the sound recording device, and means for producing a current of air through the tapered cylinder.

5. In an apparatus of the class described, an elongated cylinder which tapers from one end to the other, a motion picture camera and a sound recording device located adjacent to the small end of the cylinder, a connection from the cylinder to the reproducer of the sound recording device, means for producing a current of air through the tapered cylinder, and a housing located at the large end of said cylinder.

6. In an apparatus of the class described, an elongated cylinder which tapers from one end to the other, a motion picture camera and a sound recording device located adjacent to the small end of the cylinder, a connection from the cylinder to the reproducer of the sound recording device, means for producing a current of air through the tapered cylinder, a housing located at the large end of said cylinder, and means for lighting the interior of said housing.

7. The combination with a motion picture apparatus and a sound recording device which are adapted to operate sychronously, of an elongated tapered tube, the small end of which is connected to the reproducer of the sound recording device, and means for creating a current of air through said tapered tube.

8. The combination with a sound recording device, of an elongated tapered tube, the small end of which is connected to the reproducer of the sound recording device, means for creating a current of air through said tapered tube, a motion picture camera located adjacent to the sound recording device, and which camera and sound recording device are adapted to be operated synchronously.

9. In an apparatus of the class described, the combination with a motion picture machine and a phonograph, which are adapted to operate synchronously, of a housing adapted to receive objects upon which the picture machine is focused, a tube leading from said housing to the phonograph and means for forcing sound waves created within the housing through the tube toward the phonograph.

10. In an apparatus of the class described, the combination with a motion picture machine and a phonograph which are adapted to operate synchronously, of a housing adapted to receive objects upon which the picture machine is focused, a tube leading from said housing to the phonograph, means for artificially lighting the interior of the housing and means for forcing sound waves created within the housing through the tube toward the phonograph.

11. In an apparatus of the class described, the combination with a motion picture machine and a phonograph which are adapted to operate synchronously, of a housing adapted to receive objects upon which the picture machine is focused, a tube leading from said housing to the phonograph, and means for creating a current of air through the housing and tube toward the phonograph.

12. In an apparatus of the class described, the combination with a motion picture machine and a phonograph, which are adapted to operate synchronously, of a housing adapted to receive objects upon which the picture machine is focused, a tube leading from said housing to the phonograph, means for artificially lighting the interior of the housing, and means for creating a current of air through the housing and tube toward the phonograph.

In testimony whereof I hereunto affix my signature, in the presence of two witnesses, this 12th day of March, 1914.

DAVID O. ROYSTER.

Witnesses:
 WM. H. SCOTT,
 A. B. LEWIS.